(12) United States Patent
West (10) Patent No.: US 8,794,656 B2
(45) Date of Patent: Aug. 5, 2014

(54) TRAILER TOWING SYSTEM WITH ADJUSTABLE DRAWBAR

(75) Inventor: Gabe West, Portland, OR (US)

(73) Assignee: Silver Eagle Manufacturing Company, Portland, OR (US)

( * ) Notice: Subject to any disclaimer, the term of this patent is extended or adjusted under 35 U.S.C. 154(b) by 0 days.

(21) Appl. No.: 13/250,921

(22) Filed: Sep. 30, 2011

(65) Prior Publication Data

US 2012/0080866 A1    Apr. 5, 2012

Related U.S. Application Data

(60) Provisional application No. 61/388,562, filed on Sep. 30, 2010.

(51) Int. Cl.
*B62D 53/04* (2006.01)
(52) U.S. Cl.
USPC ............... 280/476.1; 280/491.2; 280/482; 280/479.2
(58) Field of Classification Search
USPC .................. 280/476.1, 491.2, 482, 479.2
See application file for complete search history.

(56) References Cited

U.S. PATENT DOCUMENTS

| | | | | |
|---|---|---|---|---|
| 3,014,738 A | * | 12/1961 | Kasten | 280/482 |
| 3,827,723 A | * | 8/1974 | Neff et al. | 280/476.1 |
| 4,230,335 A | * | 10/1980 | Glassmeyer | 280/476.1 |
| 4,611,821 A | * | 9/1986 | Jeanson et al. | 280/482 |
| 4,930,800 A | * | 6/1990 | Jean-Luc | 280/446.1 |
| 5,098,115 A | * | 3/1992 | Haire et al. | 280/476.1 |
| 5,338,050 A | | 8/1994 | Haire et al. | |
| 5,407,221 A | * | 4/1995 | Haire et al. | 280/476.1 |
| 5,924,716 A | * | 7/1999 | Burkhart et al. | 280/476.1 |
| 6,056,309 A | | 5/2000 | Brown | |
| 6,308,977 B1 | | 10/2001 | Pulliam et al. | |
| 6,354,448 B1 | | 3/2002 | Ramne | |
| 2002/0107627 A1 | * | 8/2002 | Funke et al. | 701/70 |
| 2007/0138760 A1 | * | 6/2007 | Granzow | 280/491.2 |
| 2010/0213687 A1 | * | 8/2010 | McDaniel et al. | 280/491.2 |

OTHER PUBLICATIONS

Pullrite, SuperGlide—Short Box 5th Wheel Towing, http://www.pullrite.com/superglide.htm, visited Mar. 31, 2010, 1 page.

* cited by examiner

*Primary Examiner* — Joseph M Rocca
*Assistant Examiner* — Michael Stabley
(74) *Attorney, Agent, or Firm* — Stoel Rives LLP (57) ABSTRACT

A trailer converter dolly includes a frame bearing a fifth wheel supported by a suspension mechanism, an axle assembly, and a wheel assembly. A drawbar housing secured to the front of the frame moveably receives a drawbar which is configured to move toward and away from a leading truck or trailer, thus adjusting the distance between the towed trailer attached to the trailer converter dolly and a leading truck or trailer. A speed sensor determines the speed of the trailer converter dolly and provides one or more signals relating to the speed of the trailer converter dolly. An automatic adjusting mechanism associated with the moveable drawbar moves the drawbar in response to the one or more speed signals provided by the speed sensor.

35 Claims, 6 Drawing Sheets

TRAILER TOWING SYSTEM WITH ADJUSTABLE DRAWBAR

RELATED APPLICATION DATA

This application claims priority to U.S. provisional application No. 61/388,562 filed Sep. 30, 2010 and titled "Automatically Adjusting Trailer Converter Dolly," which is fully incorporated herein by reference.

TECHNICAL FIELD

The present disclosure relates to trailer converter dollies, and in particular to trailer converter dollies that dynamically change a towing distance between a secondary trailer and a leading trailer or truck.

BACKGROUND

Semi-trailer trucks include a fifth wheel for towing a semi-trailer which includes a kingpin for connecting to the fifth wheel. It is often desirable for a semi-trailer truck, or a box truck, to tow one or more additional semi-trailers. A trailer converter dolly is commonly used to link one or more secondary semi-trailers to a leading semi-trailer or box truck. Alternaively, a dedicated full trailer having an integrated dolly may be linked behind a truck or leading trailer. Conventional trailer converter dollies and dollies of full trailers include a frame, a wheel axle assembly, wheels, and a fifth wheel commonly supported by a suspension mechanism. A drawbar assembly attached to the front of the frame often includes two individual bars that extend and converge away from the frame in what is commonly referred to as an A-shape configuration. Conventional drawbar assemblies typically have a fixed length and therefore maintain a towed trailer at a set distance behind a truck or other trailer. Such a set distance is typically large enough to allow maneuvering a trailer connected to the trailer converter dolly around tight corners, such as encountered in city driving conditions, without the trailer impacting the leading truck or trailer.

However, a problem with providing a space that permits such maneuverability is that the relatively large gap between the towed trailer and the leading truck or trailer reduces aerodynamic efficiency at highway speeds due to drag induced by a low pressure area formed between the towed trailer and the leading truck or trailer. Reduced aerodynamic efficiency reduces fuel economy, and is therefore undesirable. However, if the towed trailer is too close to the leading truck or trailer, the towed trailer will likely impact the leading truck or trailer when negotiating tight turns such as those encountered in city driving.

U.S. Pat. No. 5,338,050 discloses a trailer converter dolly that (1) provides a towed trailer with sufficient space to maneuver around sharp corners without impacting a leading truck or trailer and (2) reduces the gap between two trailers for travelling at highway speeds. The trailer converter dolly disclosed in the '050 patent describes a mechanism that requires stopping a truck to adjust the length of the drawbar. Once stopped, the mechanism withdraws a pin from a hole in the drawbar and the truck is moved to misalign the pin from the hole. A spring then urges the pin into contact with the drawbar, and as the truck continues to move the pin moves into the next hole in the drawbar. To make a further adjustment, the pin must again be removed from the hole it is in and the truck moved until the pin moves into the next hole in the drawbar.

The present inventor has recognized that the trailer converter dolly disclosed in the '050 patent has several disadvantages. One such disadvantage is that the tractor trailer must be stopped to adjust the length of the drawbar. Stopping a truck is time consuming and may be hard to accomplish because finding a place to stop a semi-tractor towing two or three trailers can be difficult. Another disadvantage is that the disclosed mechanism locks in each discrete position thus making it cumbersome to move the drawbar from its fully extended position to its fully retracted position. Another disadvantage is that the drawbar of the '050 trailer converter dolly includes two A-frame shaped bars. The present inventor has recognized that an A-shaped drawbar assembly increases the likelihood that the drawbar may impact the leading truck or trailer during tight maneuvering, and hinders access to the front of the towed trailer where an operator needs to access trailer hook-ups such as electrical connections and air lines.

The present inventor has thus recognized a need for a trailer converter dolly that automatically adjusts the distance between a towed trailer and a leading truck or trailer while the leading truck or trailer and the towed trailer are moving to provide clearance for maneuvering around tight turns and to reduce the gap between the towed trailer and the leading truck or trailer to reduce aerodynamic drag. The present inventor has also recognized a need for a trailer converter dolly that smoothly and easily adjusts a drawbar between a fully extended position and a fully retracted position, as well as a need for a trailer converter dolly that provides increased clearance from a leading truck or trailer and facilitates access to the front of a towed trailer.

SUMMARY

Embodiments described herein address one or more of the above identified needs for a trailer converter dolly, or may address other suitable needs.

In a preferred arrangement, a trailer converter dolly includes a frame bearing a fifth wheel supported by a suspension mechanism, an axle assembly, and a wheel assembly. A drawbar housing secured to the front of the frame moveably receives a drawbar which is configured to move toward and away from a leading truck or trailer, thus adjusting the towing distance between the towed trailer attached to the trailer converter dolly and a leading truck or trailer. A speed sensor determines the speed of the trailer converter dolly and provides one or more signals relating to the speed of the trailer converter dolly. An automatic adjusting mechanism associated with the moveable drawbar moves the drawbar in response to the one or more speed signals provided by the speed sensor.

Additional aspects and advantages will be apparent from the following detailed description of preferred embodiments, which proceeds with reference to the accompanying drawings.

DETAILED DESCRIPTION OF PREFERRED EMBODIMENTS

Figure 1:
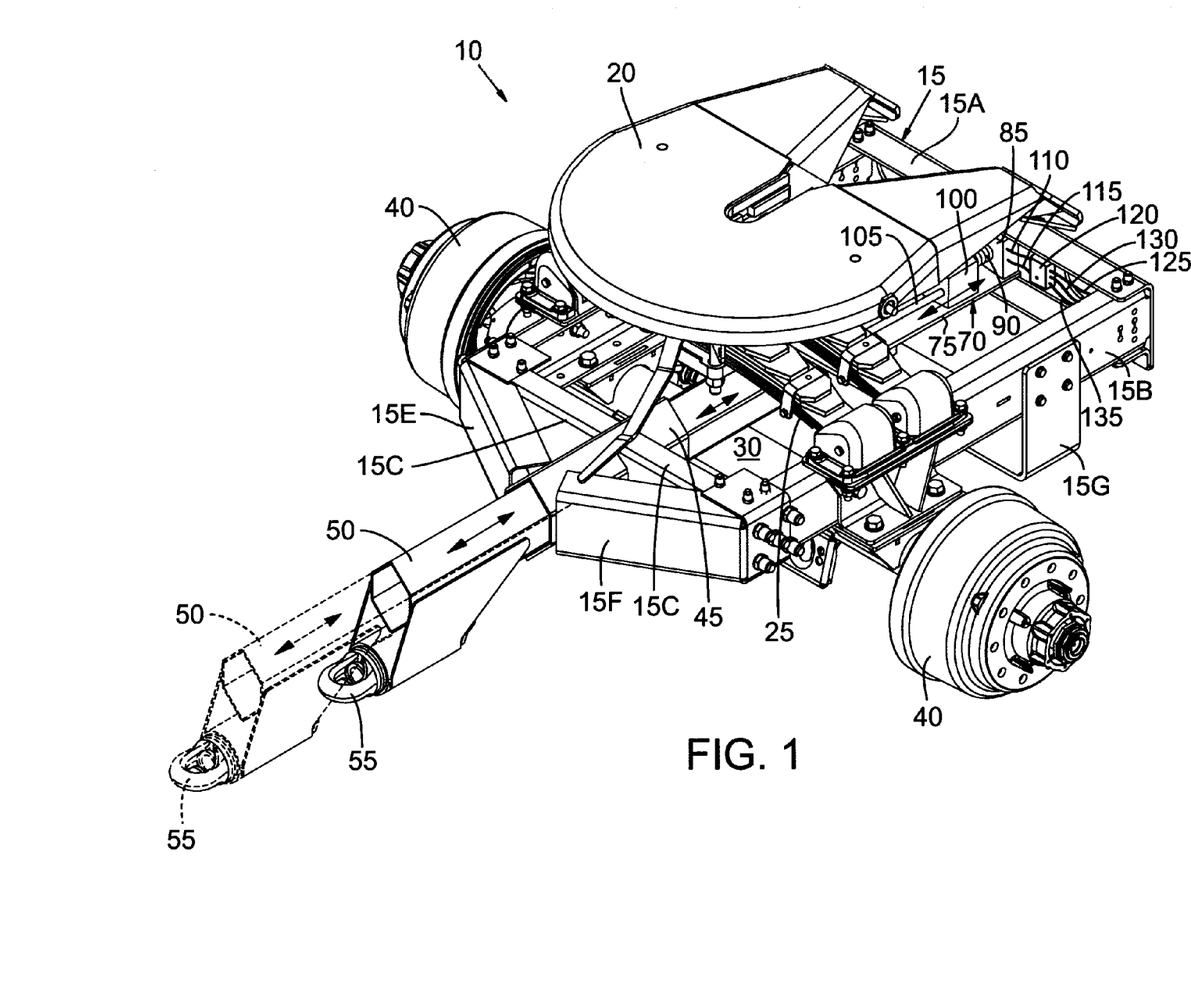
FIG. 1 is a perspective view of a preferred arrangement for a trailer converter dolly, including a schematic illustration of an automatic adjustment mechanism.
Figure 2:
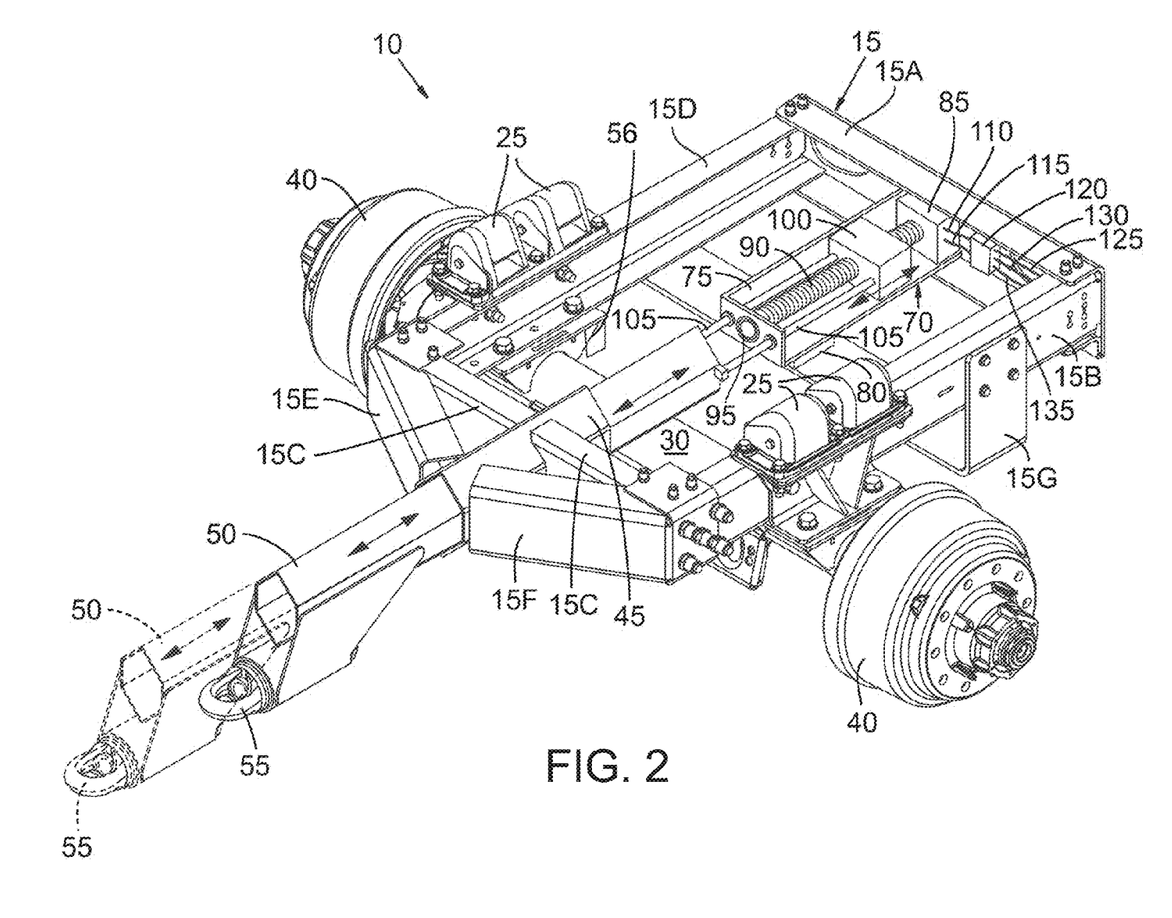
FIG. 2 is a perspective view of the trailer converter dolly of FIG. 1 with the schematic illustration of an automatic adjustment mechanism, but with the fifth wheel and portions of the suspension removed.

FIGS. 1 and 2 illustrate a preferred arrangement for a trailer converter dolly 10 with an automatically adjustable length drawbar. Trailer converter dolly 10 includes a frame 15 having four main frame components 15A, 15B, 15C, and 15D connected in a rectangular form. Other suitable frames may be used. A fifth wheel 20 is mounted to a suspension mechanism 25 which is connected to frame 15. Frame 15 also supports an axle assembly 30 which in turn supports two wheel assemblies 40. In other embodiments, frame 15, fifth wheel 20, suspension mechanism 25, axle assembly 30 and wheel assemblies 40 may include conventional arrangements, including that described in U.S. Pat. No. 6,056,309 which is fully incorporated by reference herein.

A drawbar housing 45 is secured to two additional frame members 15E and 15F proximate the front of frame 15. Drawbar housing 45 is also connected to frame member 15C, for example, by welding, bolts, or other suitable attachment. Drawbar 50 is moveably received in drawbar housing 45 so that as the drawbar 50 extends out of the drawbar housing 45 the frame 15 is moved farther from a leading truck or trailer and as the drawbar 50 is withdrawn into the drawbar housing 45 the frame 15 is moved closer to a leading truck or trailer. A trailer connecter 55 is attached proximate the front of drawbar 50. Trailer connecter 55 may include a ball connecter or pintle hitch as is well known in the art.

A speed sensor is operably connected to trailer converter dolly 10. In a preferred embodiment, the speed sensor 56 (schematically illustrated in FIG. 2) includes an antilock braking system resident on trailer converter dolly 10. The antilock braking system includes a programmable controller that is programmed to initiate one or more signals, for example, in the form of a voltage, in response to determining that the trailer converter dolly 10 is moving at or below, or at or above, one or more predetermined speeds. In other arrangements, a speed sensor 56 may include an optical sensor monitoring the wheel assembly 40, a Doppler-based speed sensor, or other suitable speed sensor 56. The speed sensor 56 does not need to be directly connected to trailer converter dolly 10, but may be incorporated into a trailer attached to fifth wheel 20, to a semi-tractor truck (not illustrated), or other suitable location.

In some embodiments, an optional position detector may be associated with drawbar 50, drawbar housing 45, or both. The position detector detects the position of drawbar 50 with respect to drawbar housing 45. For example, a position detector determines when drawbar 50 is in a fully extended position, in a fully retracted position, or at some position in between. Exemplary position detectors include rotary or shaft encoders, optical sensors, magnetic field detectors, a position or displacement transducer, or other suitable sensor. Use of an optional position detector is described below.

An automatically driven adjustment mechanism 70 is operably attached to drawbar 50. Automatically driven adjustment mechanism 70 automatically moves drawbar 50 to the fully extended position, to the fully retracted position, or optionally, to any position there between based on the speed of trailer converter dolly 10.

The exemplary embodiment illustrated in FIGS. 1 and 2 does not include a position detector. An adjustment mechanism housing 75 is attached at a rear end to frame member 15A, for example by bolts or welding. A front end of adjustment mechanism housing 75 is attached to frame member 15G, for example, via a housing support post 80. An air motor 85 is contained in the adjustment mechanism housing 75 proximate the rear of the adjustment mechanism housing 75. The drive shaft of air motor 85 is coupled to threaded shaft 90 which is supported proximate the front of adjustment mechanism housing 75 by a rotational support, such as a ball bearing 95. A nut 100 is rotationally coupled to threaded shaft 90 such that rotation of threaded shaft 90 in a first direction causes nut 100 to move toward the front of adjustment mechanism housing 75 and rotation of threaded shaft 90 in a second, opposite direction causes nut 100 to move toward the rear of adjustment mechanism housing 75.

Drawbar driver rods 105 are secured to nut 100, for example, by welding or other suitable attachment. Drawbar driver rods 105 extend out of the front of adjustment mechanism housing 75 and are affixed to drawbar 50, for example, by welding or other suitable attachment. Movement of nut 100 toward the front end of adjustment mechanism housing 75 thus causes drawbar 50 to extend from drawbar housing 45. And, movement of nut 100 toward the rear end of adjustment mechanism housing 75 thus causes drawbar 50 to withdraw into drawbar housing 45. In a preferred arrangement, nut 100 moves approximately 28 inches over the entire course of its range. Other suitable distances may be used, such as 30 inches or 36 inches, for example.

The air motor 85 receives pressurized air through either a first air line 110 or a second air line 115. Pressurized air received via first air line 110 drives air motor 85 in the first direction and pressurized air received via second air line 115 drives air motor 85 in the second, opposite direction. First and second air lines 110 and 115 are connected to a pressurized air source, such as a pressurized air tank (not illustrated for clarity), through a relay valve 120. Relay valve 120 connects to a pressurized air source via air inlet 125 and receives electrical power via power line 130. Relay valve 120 also receives a signal from the speed sensor 56, which may reach relay valve 120 via a signal line 135 or may be encoded over power line 130. For example, the speed sensor 56 preferably includes an anti-lock brake system ("ABS"—not illustrated) housed in wheel assembly 40 that is programmed to place a first voltage on signal line 135 upon detecting when trailer converter dolly 10 is travelling at 35 miles an hour and to place a second, different voltage on signal line 135 upon detecting when trailer converter dolly 10 is travelling at 40 miles an hour.

In other arrangements, automatically driven adjustment mechanism 70 may include an Acme, ball, or roller screw arrangement for transforming rotational motion of an output shaft from a power source into linear movement of drawbar 50. A pneumatic or electric motor may turn a shaft which may be rotatably connected to drawbar 50. A nut may be coupled to the shaft and affixed to a portion of the frame 15, the drawbar housing 45, or both. Rotation of the shaft may drive the drawbar 50 out of, or into, drawbar housing 45 depending on the direction of rotation of the shaft. Or, a motor may turn a nut to move a threaded shaft therethrough. Other suitable automatically driven adjustment mechanisms may be used, including hydraulic cylinders attached to a drawbar 50 to longitudinally move the drawbar 50, a rack and pinion arrangement, a worm gear, or other suitable mechanism.

Figure 3:
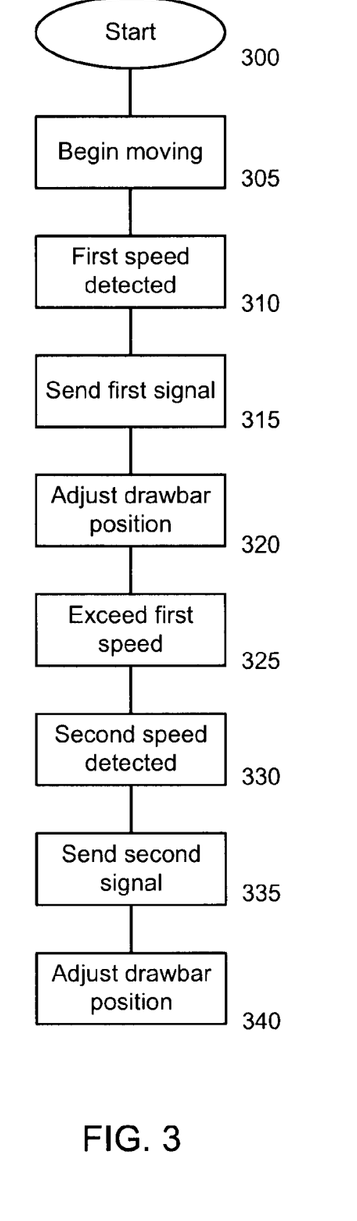
FIG. 3 is a schematic illustration of a flow for performing a method according to one embodiment.

In operation, a trailer connected to trailer converter dolly 10 is loaded and a truck towing trailer converter dolly 10 begins to move. An exemplary method is schematically illustrated in FIG. 3. At 300, nut 100 is proximate the front end of adjustment mechanism housing 75, thus drawbar 50 is at its fully extended position. The speed sensor 56 within the ABS detects that the trailer converter dolly 10 is moving at 305, but that the speed is less than 35 miles an hour so no voltage or other signal is placed on signal line 135.

As the truck speeds up at 310 the speed sensor 56 within the ABS detects that trailer converter dolly 10 is moving at 35 miles an hour and places a first signal, such as a voltage of 2 volts, on signal line 135. At 315 relay valve 120 receives the first signal and causes pressurized air to flow into the first air line 110 at 320, but air motor 85 is unable to drive threaded shaft 90 in the first direction because nut 100 is already proximate the front end of adjustment mechanism housing 75.

As the truck exceeds 35 miles an hour at 325 the speed sensor 56 within the ABS detects that trailer converter dolly 10 is not moving at 35 miles an hour and removes the first signal from signal line 135. Relay valve 120 may be configured to supply pressurized air only for the duration that the first signal is placed on signal line 135, or may be configured to supply pressurized air for a predetermined time sufficient to fully move nut 100 from proximate the rear end to proximate the front end of adjustment mechanism housing 75 upon receiving the first signal. In either event, drawbar 50 remains at its fully extended position, similar to that illustrated in FIG. 4.

Figure 5:
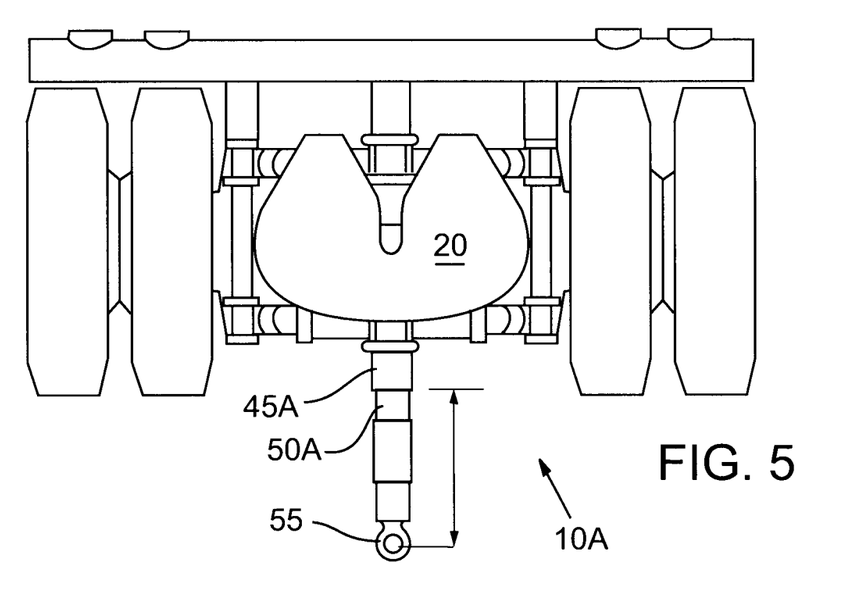
FIG. 5 is a top view of the trailer converter dolly of FIG. 4 with the drawbar in a fully retracted position.

When the truck reaches 40 miles an hour at 330 the speed sensor 56 within the ABS detects that trailer converter dolly 10 is moving at 40 miles an hour and places a second signal, such as a voltage of 12 volts, on signal line 135. At 335 relay valve 120 receives the second signal and causes pressurized air to flow into the second air line 115. Relay valve 120 may be configured to supply pressurized air only for the duration that the second signal is placed on signal line 135, or may be configured to supply pressurized air for a predetermined time sufficient to fully move nut 100 from proximate the front end to proximate the rear end of adjustment mechanism housing 75 upon receiving the second signal. Preferably, at 340 nut 100 is moved proximate the rear end of adjustment mechanism housing 75 in response to the relay valve 120 receiving the second signal. Drawbar 50 is therefore preferably moved to its fully retracted position, similar to that illustrated in FIG. 5.

When the truck slows down the procedure is carried out in reverse. That is, the drawbar 50 remains at its fully retracted position as the truck, and thus the trailer converter dolly 10, reduces speed through 40 miles an hour. When the trailer converter dolly 10 reaches 35 miles an hour the speed sensor 56 within the ABS places the first signal on signal line 135 thus causing the relay valve 120 to drive air motor 85 until nut 100 is proximate the front end of adjustment mechanism housing 75.

Figure 6:
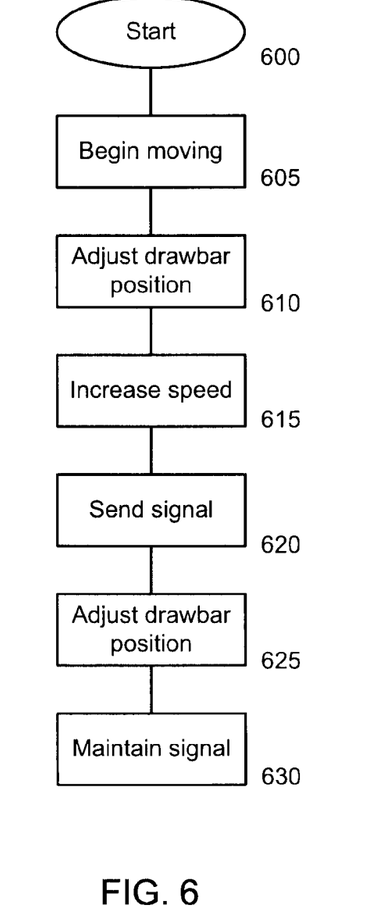
FIG. 6 is a schematic illustration of a flow for performing another method according to one embodiment.

With reference to FIG. 6, in another embodiment only one signal may be sent to the automatically driven adjustment mechanism 70. At 600, nut 100 is proximate the front end of adjustment mechanism housing 75, thus drawbar 50 is at its fully extended position. The speed sensor 56 within the ABS detects that the trailer converter dolly 10 is moving at 605, but that the speed is less than 35 miles an hour so no voltage or other signal is placed on signal line 135 which causes automatically driven adjustment mechanism 70 to attempt to drive threaded shaft 90 in a first direction at 610 to move drawbar 50 to its fully extended position.

As the truck speeds up at 615 the speed sensor 56 within the ABS detects that trailer converter dolly 10 is moving at 40 miles an hour and places a signal on signal line 135 at 620. At 625 relay valve 120 receives the signal and causes pressurized air to flow into the first air line 110 to drive threaded shaft 90 in a second direction to move drawbar 50 to its fully retracted position.

As the truck exceeds 40 miles an hour at 630 the speed sensor 56 within the ABS detects that trailer converter dolly 10 is moving at or faster than 40 miles an hour and maintains the signal on signal line 135, which causes drawbar 50 to remain at its fully retracted position.

When the truck slows down the procedure is carried out in reverse. That is, the drawbar 50 remains at its fully retracted position as the truck, and thus the trailer converter dolly 10, reduces speed through 40 miles an hour. When the trailer converter dolly 10 reaches 40 miles an hour the speed sensor 56 within the ABS removes the signal from signal line 135 thus causing the relay valve 120 to drive air motor 85 until nut 100 is proximate the front end of adjustment mechanism housing 75.

The embodiment illustrated in FIGS. 1 and 2 dynamically adjusts the position of a towed trailer by extending and retracting the drawbar 50 in response to trailer converter dolly 10's speed. A truck towing trailer converter dolly 10 is not required to stop to carry out such adjustments. By fully extending drawbar 50, for example, at speeds of 35 miles an hour or slower, the towed trailer is at a sufficient distance to permit negotiation of tight turns, which are typically encountered at slower speeds, without impacting a leading truck or trailer. By fully retracting drawbar 50, for example, at speeds of 40 miles an hour or faster, the towed trailer is moved closer to a leading truck or trailer, thus increasing aerodynamic efficiency and reducing drag for higher speed travel, during which tight turns are typically not negotiated. Other suitable speeds, such as 30 miles an hour and 45 miles an hour, may be selected for triggering extension and retraction of drawbar 50.

In one arrangement, if relay valve 120 loses electrical power, relay valve 120 causes air to flow through the first air line 110. Thus, the drawbar 50 is extended to a default position that allows tight turns to be negotiated without impacting a towed trailer against a leading truck or trailer. In another arrangement, if the energy source to air motor 85, or other suitable motive element, is lost, the automatically driven adjustment mechanism 70 may permit threaded shaft 90 to freewheel, thus increasing the likelihood that nut 100 will move proximate the front end of adjustment mechanism housing 75. Preferably, a latch or other suitable lock may be used to secure nut 100 proximate the front end of the adjustment mechanism housing 75 to retain the drawbar 50 in its extended position should a loss of motive power be lost. For example, in an arrangement using a hydraulic cylinder to move drawbar 50, a return spring could be included and arranged to extend drawbar 50 from drawbar housing 45 in the event pressurized fluid is not available to the hydraulic cylinder. A suitable spring-loaded arrangement, or other suitable mechanical device, may also be used with a threaded shaft/nut arrangement to freewheel the threaded shaft/nut arrangement by pushing a trailer converter dolly away from a leading truck or trailer in the event motive power for an automatically driven adjustment mechanism is lost.

Optionally, a processor may be operably connected to the speed sensor 56, a position detector, when included, and the automatically driven adjustment mechanism 70. When included, a processor receives a signal from the speed sensor 56 indicative of the speed of the trailer converter dolly 10. The processor also receives a position signal from the position detector indicative of the position of drawbar 50 with respect to drawbar housing 45. Based on the speed of the trailer converter dolly 10 the processor may determine a desired position for drawbar 50 with respect to drawbar housing 45.

Figure 7:
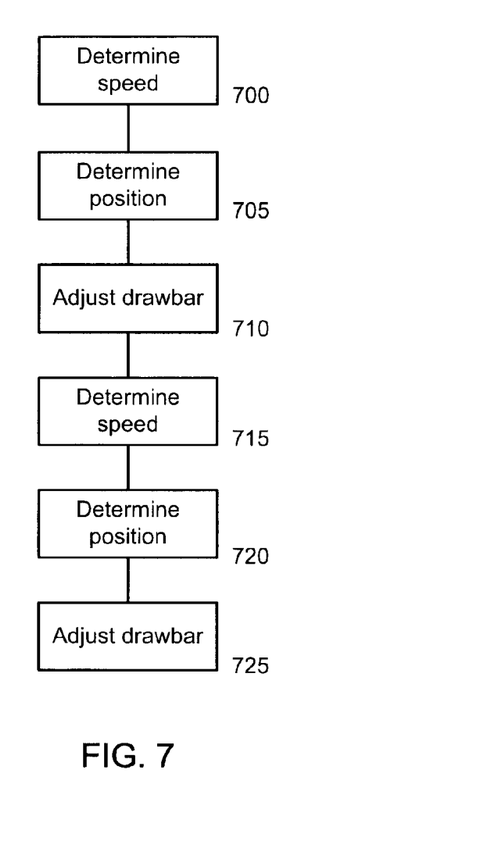
FIG. 7 is a schematic illustration of a flow for performing another method according to one embodiment.

As illustrated in FIG. 7, for example, if the speed sensor 56 sends a signal to the processor indicating the trailer converter dolly 10 is travelling at 35 miles an hour at 700, the processor determines that the drawbar 50 should be at its fully extended position. At 705, the processor checks the signal from the position detector to determine whether the drawbar 50 is at its fully extended position. If the drawbar 50 is not at its fully extended position, at 710 the processor sends a signal to adjustment mechanism 70 to move drawbar 50 with respect to drawbar housing 45 until drawbar 50 is at its fully extended position. At 715, if the speed sensor 56 sends a signal to the processor indicating the trailer converter dolly 10 is travelling at 40 miles an hour, the processor determines that the drawbar 50 should be at its fully retracted position. At 720, the processor checks the signal from the position detector to determine whether the drawbar 50 is at its fully retracted position. If the drawbar 50 is not at its fully retracted position, at 725 the processor sends a signal to automatically driven adjustment mechanism 70 to move drawbar 50 with respect to drawbar housing 45 until drawbar 50 is at its fully retracted position. Other speeds may be used to trigger moving drawbar 50 to its fully extended or fully retracted position.

In other embodiments when a position detector and a processor are included, the processor may be programmed to position the drawbar 50 at various positions depending on the speed of the trailer converter dolly 10. For example, the processor may be programmed to cause automatically driven adjustment mechanism 70 to fully extend drawbar 50 when trailer converter dolly 10 is travelling at or below 35 miles an hour, to retract drawbar 50 half-way when trailer converter dolly 10 is travelling between 35 and 40 miles an hour, and to fully retract drawbar 50 when trailer converter dolly 10 is travelling at or above 40 miles an hour.

In other embodiments, the processor may be programmed to set or determine the distance drawbar 50 withdraws, or retracts, into the drawbar housing 45 to reach the fully retracted position. For example, trailer dolly converter 10 may be connected to two similar trailers, one with a front-mounted refrigeration unit and one without a front-mounted refrigeration unit. Drawbar 50 will be able to retract further into drawbar housing 45 when trailer converter dolly 10 is connected to the trailer without a front-mounted refrigeration unit than when trailer converter dolly 10 is connected to the trailer with a front-mounted refrigeration unit.

Figure 8:
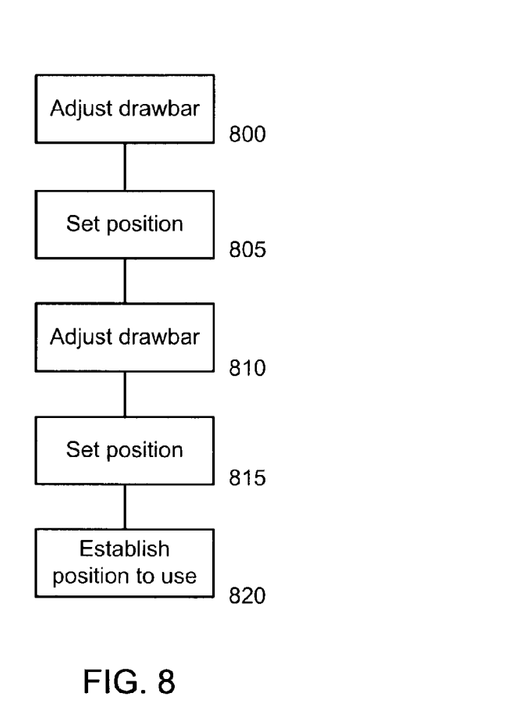
FIG. 8 is a schematic illustration of a flow for performing another method according to one embodiment.

With reference to FIG. 8, with the trailer without a front-mounted refrigeration unit connected to the trailer converter dolly 10, and the trailer converter dolly 10 attached to a hitch on a lead trailer, at 800 an operator may retract drawbar 50 until a desired clearance between the trailer and the lead trailer is reached, approximately 12 inches for example. At 805, an interface, such as a touch screen or switch panel mounted on trailer converter dolly 10, a wireless remote, or other suitable interface, may be used to cause the processor to receive a position signal from the position detector and to set such position as the fully retracted position.

In other embodiments, such a fully retracted position may be associated with a name or number to differentiate such a fully retracted position for the trailer without the front-mounted refrigeration unit from other fully retracted positions associated with different trailers. For example, at 810 a similar procedure may be used to set a fully retracted position for the trailer with the front-mounted refrigeration unit. The fully retracted position for the trailer without the front-mounted refrigeration unit may be indicated as position number 1 and the fully retracted position for the trailer with the front-mounted refrigeration unit may be indicated as position number 2. Then, when the trailer without the front-mounted refrigeration unit is connected to trailer converter dolly 10, at 815 an indication may be sent to the processor using a suitable interface to cause the processor to use position number 1 as the fully retracted position. If the trailer with the front-mounted refrigeration unit is connected to the trailer converter dolly 10 instead of the trailer without the front-mounted refrigeration unit, at 820 the interface may be used to cause the processor to use position number 2 as the fully retracted position. In other embodiments, the processor may communicate with a database that provides various fully retracted positions to use based on receiving an input indicating what type or configuration of trailer is connected to trailer converter dolly 10.

Figure 9:
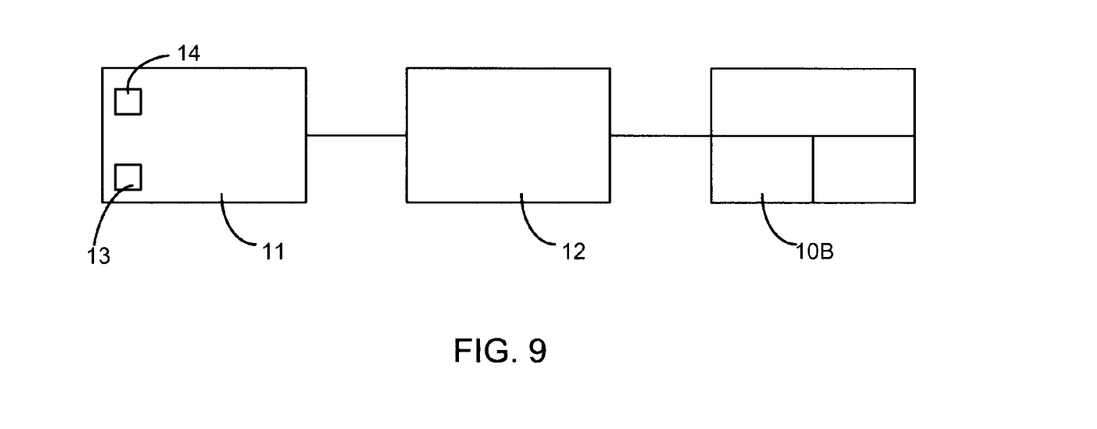
FIG. 9 is a schematic illustration of an exemplary manually operated embodiment of a trailer converter dolly.

With reference to FIG. 9, in another embodiment a trailer converter dolly 10B, may be manually adjustable while a driving vehicle 11 is moving instead of being automatically adjustable. A speedometer associated with the driving vehicle 11 may be used to determine or estimate the trailer converter dolly 10A's speed. An optional position detector may be associated with the trailer converter dolly 10B to detect the position of a drawbar with respect to a drawbar housing, for example, as described above, or to detect or determine a distance between the trailer converter dolly 10A and the towing vehicle 12.

An adjustment mechanism, similar to automatically driven adjustment mechanism 70 discussed above, is operably attached to the drawbar of the trailer converter dolly 10B. The adjustment mechanism is also operably connected to a switch 13 located in the cab of the driving vehicle 11. Based on an observed speed indicated by the speedometer, a driver uses the switch 13 to selectively extend or retract the drawbar of the trailer converter dolly 10B. For example, a two position switch may be used where the first position of the switch causes the adjustment mechanism to extend the drawbar and the second position of the switch causes the adjustment mechanism to retract the drawbar. Speeds, such as those described above, may be used by the driver to determine when to extend or retract the drawbar. Optionally, a sensor may be operably attached between the trailer converter dolly 10B, the speedometer, and a warning indicator 14 in the cab of the driving vehicle 11 to activate the warning indicator 14 to alert a driver when the drawbar is in one position, but should be in the other. For example, when a driver slows from highway speeds with the drawbar retracted, but does not extend the drawbar at an appropriate speed, such as 35 miles per hour, for example, the sensor may detect that the drawbar is retracted and that the vehicle speed is at or below 35 miles per hour. In response to such detection, the sensor may activate a warning light, audio tone, or other appropriate warning indicator 14 to alert the driver that the drawbar should be extended. In other embodiments, multiple warning indicators 14 may be included, where each warning indicator 14 is specific to which position the drawbar should be in.

In other embodiments, both an automatically adjusting mechanism, such as automatically adjusting mechanism 70, and a manually operated switch may be included. The manually operated switch may serve as an override to move the drawbar to a position other than where the automatically adjusting mechanism positions the drawbar.

Figure 4:
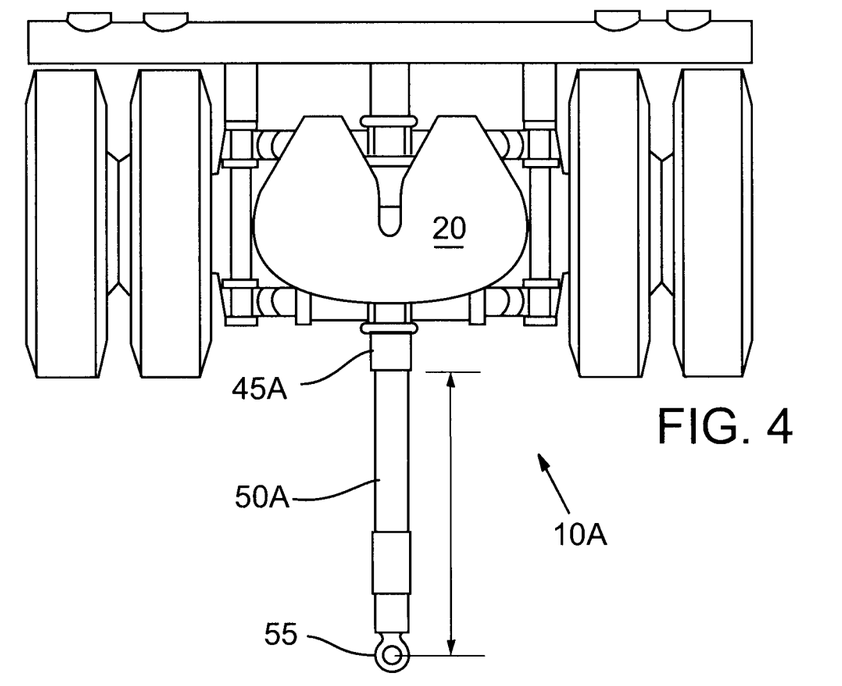
FIG. 4 is a top view of another embodiment of a trailer converter dolly with the drawbar in a fully extended position.
Figure 10:
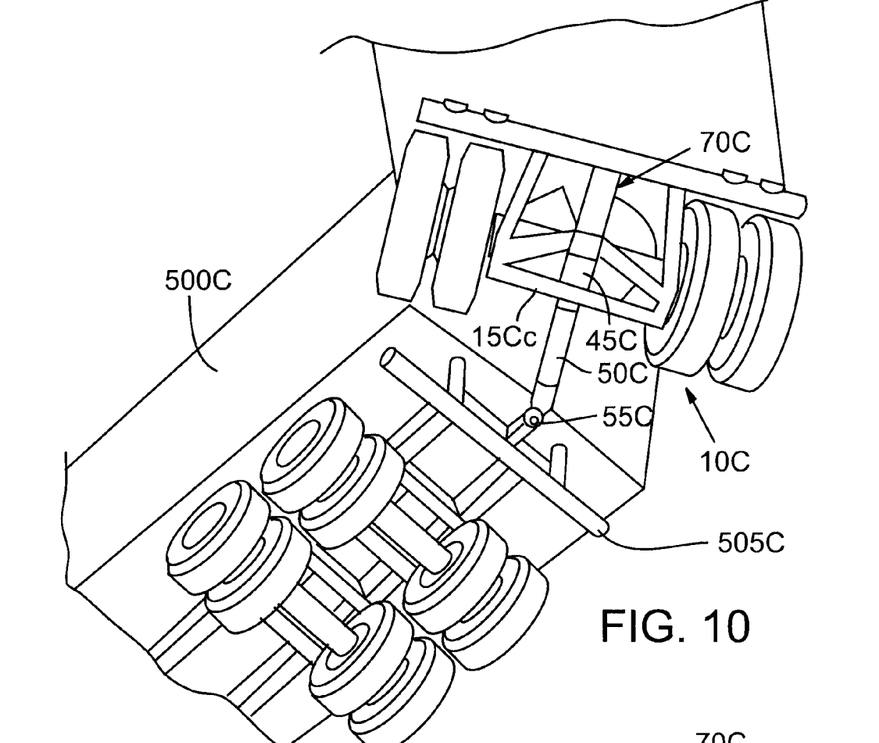
FIG. 10 is a bottom schematic view illustrating drawbar clearance.
Figure 11:
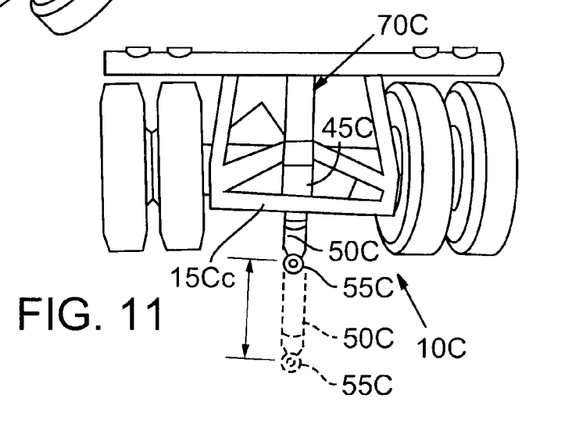
FIG. 11 is a front schematic view illustrating trailer access.

As best illustrated in FIG. 10, trailer converter dolly 10C provides increased clearance for drawbar 50C compared to conventional trailer converter dollies. For example, when turned at a relatively sharp angle, such as illustrated in FIG. 11, drawbar 50C is well clear of any portion of leading trailer 500C. However, a conventional dolly with an A-frame drawbar arrangement is likely to contact bumper 505C when such a sharp angle is encountered. Therefore, a Y-shaped or T-shaped drawbar arrangement, such as illustrated in FIGS. 1 and 4 (respectively), for example, provides greater clearance and less likelihood of damaging either a leading trailer or a drawbar due to maneuvering around relatively sharp corners. An additional advantage of trailer converter dolly 10C is that it provides easier access to the front of a towed trailer than conventional trailer converter dollies do. As best illustrated in FIG. 11, the drawbar 50C components do not substantially block the wheel assemblies 40C, thus facilitating a driver's access to the front of a towed trailer, for example, to hook up electrical and pneumatic lines.

It will be obvious to those having skill in the art that many changes may be made to the details of the above-described embodiments without departing from the underlying principles of the invention.

The invention claimed is:

1. A trailer towing system comprising:
an axle assembly;
a frame supported by the axle assembly;
a fifth wheel assembly supported by the frame;
an adjustable drawbar attached to the frame and having a front portion located forward of the frame along a longitudinal axis for coupling to a towing vehicle, the front portion of the drawbar moveable along the longitudinal axis between an extended position and a retracted position; and
an automatically driven adjustment mechanism operatively coupled to the drawbar and communicating with a speed sensor, wherein the automatically driven adjustment mechanism is configured to adjust the position of the front portion of the drawbar with respect to the frame in response to receiving at least one signal from the speed sensor indicative of a speed of the trailer towing system.

2. The trailer towing system according to claim 1, wherein:
the at least one signal indicative of the speed includes a first signal transition indicative of a first speed and a second signal transition indicative of a second speed;
the automatically driven adjustment mechanism is further configured to adjust the drawbar to the extended position in response to receiving the first signal transition; and
the automatically driven adjustment mechanism is further configured to adjust the drawbar to the retracted position in response to receiving the second signal transition.

3. A trailer towing system according to claim 2, wherein the first speed is greater than the second speed.

4. A trailer towing system according to claim 3, wherein the first signal transition indicates the speed of the trailer towing system has fallen to the first speed and the second signal transition indicates the speed of the trailer dolly has risen to the second speed.

5. The trailer towing system according to claim 1, further comprising an antilock braking system including the speed sensor.

6. The trailer towing system according to claim 1, further comprising:
a processor configured to receive speed information from the speed sensor, wherein the processor communicates with the automatically driven adjustment mechanism; and
wherein the processor is configured to cause the automatically driven adjustment mechanism to adjust the position of the front portion of the drawbar based on the speed information received from the speed sensor.

7. The trailer towing system according to claim 6, further comprising:
a position detector operatively associated with the drawbar and configured to detect the position of the front portion of the drawbar, wherein the processor is further configured to receive position information from the position detector; and
wherein the processor is further configured to cause the automatically driven adjustment mechanism to adjust the position of the front portion of the drawbar based on (a) the speed information received from the speed sensor and (b) the position information received from the position detector.

8. A trailer towing system according to claim 7, further comprising:
an interface operably connected to the processor for sending to the processor an identifying indication relating to a particular trailer;
wherein the processor is programmed with position data for multiple different trailers; and
wherein the processor further controls the automatically driven adjustment mechanism to automatically adjust the position of the front portion of the drawbar based on position data corresponding to the particular trailer indicated by the identifying indication.

9. A trailer towing system according to claim 7, wherein:
the processor controls the automatically driven adjustment mechanism to automatically adjust the drawbar to the extended position based on the signal indicative of the speed indicating a first speed of the trailer; and
the processor controls the automatically driven adjustment mechanism to automatically adjust the drawbar to the retracted position based on the signal indicative of the speed indicating a second speed of the trailer different from the first speed.

10. A trailer towing system according to claim 9, wherein:
the processor controls the automatically driven adjustment mechanism to automatically adjust the drawbar to a position between the extended position and the retracted position based on the signal indicative of the speed indicating a third speed of the trailer, wherein the third speed is greater than the first speed and less than the second speed.

11. A trailer towing system according to claim 6, wherein:
the processor controls the automatically driven adjustment mechanism to automatically adjust the drawbar to the extended position based on the signal indicative of the speed indicating a first speed of the trailer; and
the processor controls the automatically driven adjustment mechanism to automatically adjust the drawbar to the retracted position based on the signal indicative of the speed indicating a second speed of the trailer different from the first speed.

12. A trailer towing system according to claim 1, wherein the drawbar is slidably mounted in a drawbar housing attached to the frame, and the drawbar and a front end of the frame together form a T-shape when viewed from a top view of the trailer towing system.

13. A trailer towing system according to claim 1, wherein the automatically driven adjustment mechanism includes:
an adjustment mechanism housing supported by the frame;
a shaft rotatably supported in the adjustment mechanism housing, wherein the shaft includes a longitudinal axis and the shaft includes an arrangement selected from one of threads, Acme, ball, or roller screw;
a motor supported by the frame, wherein the motor includes a drive shaft operably coupled to the shaft such that rotation of the drive shaft causes the shaft to rotate about its longitudinal axis;
two drawbar driver rods slidably supported by the adjustment mechanism housing and coupled to the drawbar;
a nut coupled to the two drawbar driver rods and coupled to the shaft such that rotation of the shaft about its longitudinal axis in a first rotational direction causes linear movement of the nut and of the two drawbar driver rods along the longitudinal axis of the shaft to move the drawbar toward the extended position; and
wherein rotation of the shaft about its longitudinal axis in a second rotational direction opposite the first rotational direction causes linear movement of the nut and of the two drawbar driver rods along the longitudinal axis of the shaft to move the drawbar toward the retracted position.

14. A trailer towing system according to claim 1, wherein:
the at least one signal indicative of the speed includes a first signal indicative of a first predetermined speed and a second signal indicative of a second predetermined speed;
the first signal includes a first voltage placed on a conductive line; and
the second signal includes a second voltage different from the first voltage placed on the conductive line.

15. A trailer towing system according to claim 1, further comprising a drawbar housing attached to the frame, and wherein the drawbar is slidably received in the drawbar housing.

16. A trailer towing system according to claim 1, further comprising a trailer connector attached to the front portion of the drawbar.

17. A trailer towing system according to claim 1, wherein the automatically driven adjustment mechanism includes a hydraulic cylinder.

18. A trailer towing system according to claim 1, further comprising an override switch that is manually operable to suspend automatic operation of the automatically driven adjustment mechanism.

19. A trailer towing system according to claim 18, wherein operation of the override switch causes the automatically driven adjustment mechanism to move the drawbar to a predetermined position.

20. A trailer towing system according to claim 1, wherein the automatically driven adjustment mechanism is configured to move the front portion of the drawbar to the extended position in the event that power supplied to the trailer towing system is interrupted.

21. A trailer towing system according to claim 1, further comprising a speed sensor configured to detect the speed of the trailer towing system and generate the at least one signal indicative of the speed.

22. A trailer towing system according to claim 21, further comprising a towing vehicle and wherein the speed sensor is included in the towing vehicle.

23. A trailer towing system according to claim 1, further comprising a converter dolly including the axle assembly, the frame, the fifth wheel assembly, and the adjustable drawbar.

24. A system for adjusting a drawbar of a combination vehicle and trailer assembly, the trailer assembly including an axle assembly, a frame supported on the axle assembly, a fifth wheel assembly supported by the frame, and a drawbar attached to the frame, the drawbar having a front portion located forward of the frame and moveable with respect to the frame along a longitudinal axis between an extended position and a retracted position, wherein the improvement comprises:
a speed sensor configured to detect a speed of the combination vehicle;
a driven adjustment mechanism operatively coupled to the drawbar and interposed between the drawbar and the frame; and
a switch located in a cab of the combination vehicle, the switch communicating with the adjustment mechanism, wherein, in response to operation of the switch, the adjustment mechanism is operable to drive the front portion of the drawbar along the longitudinal axis relative to the frame toward the retracted position while the entire combination vehicle and trailer assembly is moving.

25. A system according to claim 24, wherein the switch includes a two position switch.

26. A system according to claim 24, further comprising:
a position detector operatively associated with the drawbar for detecting a position of the drawbar with respect to the frame; and
a warning indicator communicating with the speed sensor and the position detector, the warning indicator operable to alert a driver of the combination vehicle when the position of the drawbar is unsuitable for the speed.

27. A system according to claim 24, further comprising a converter dolly including the axle assembly, the frame, the fifth wheel assembly, and the drawbar.

28. A system according to claim 24, further comprising a drawbar housing attached to the frame, and wherein the drawbar is slidably received in the drawbar housing, and the drawbar and a front end of the frame together form a T-shape when viewed from above.

29. A system according to claim 24, wherein the driven adjustment mechanism includes a hydraulic cylinder.

30. A system for adjusting a drawbar of a combination vehicle and trailer assembly, the trailer assembly including an axle assembly, a frame supported on the axle assembly, a fifth wheel assembly supported by the frame, and a drawbar attached to the frame, the drawbar having a front portion located forward of the frame and moveable with respect to the frame along a longitudinal axis between an extended position and a retracted position, wherein the improvement comprises:
a speed sensor configured to detect a speed of the combination vehicle;
an adjustment mechanism operatively coupled to the drawbar; and
a switch located in a cab of the combination vehicle, the switch communicating with the adjustment mechanism, wherein the adjustment mechanism is configured to adjust the position of the front portion of the drawbar along the longitudinal axis in response to operation of the switch;
a position detector operatively associated with the drawbar for detecting a position of the drawbar with respect to the frame; and
a warning indicator communicating with the speed sensor and the position detector, the warning indicator operable to alert a driver of the combination vehicle when the position of the drawbar is unsuitable for the speed.

31. A system according to claim 30, further comprising a converter dolly including the axle assembly, the frame, the fifth wheel assembly, and the drawbar.

32. A system according to claim 30, wherein the adjustment mechanism is operable to drive the front portion of the drawbar toward the retracted position while the entire combination vehicle and trailer assembly is moving.

33. A system for adjusting a drawbar of a combination vehicle and trailer assembly, the trailer assembly including an axle assembly, a frame supported on the axle assembly, a fifth wheel assembly supported by the frame, and a drawbar attached to the frame, the drawbar having a front portion located forward of the frame and moveable with respect to the frame along a longitudinal axis between an extended position and a retracted position, wherein the improvement comprises:
 a speed sensor configured to detect a speed of the combination vehicle;
 a driven adjustment mechanism operatively coupled to the drawbar and interposed between the drawbar and the frame, wherein the driven adjustment mechanism includes a hydraulic cylinder; and
 a switch located in a cab of the combination vehicle, the switch communicating with the adjustment mechanism, wherein the adjustment mechanism is configured to drive the front portion of the drawbar along the longitudinal axis relative to the frame in response to operation of the switch.

34. A system according to claim 33, wherein the switch includes a two position switch.

35. A system according to claim 33, further comprising:
 a position detector operatively associated with the drawbar for detecting a position of the drawbar with respect to the frame; and
 a warning indicator communicating with the speed sensor and the position detector, the warning indicator operable to alert a driver of the combination vehicle when the position of the drawbar is unsuitable for the speed.

* * * * *